United States Patent [19]
Lachat et al.

[11] Patent Number: 5,944,346
[45] Date of Patent: Aug. 31, 1999

[54] AIRBAG FOLDING PATTERN

[75] Inventors: Michael Joseph Lachat; Brian K. Genslak, both of Shelby Township, Mich.

[73] Assignee: Takata Inc., Auburn Hills, Mich.

[21] Appl. No.: 09/104,545

[22] Filed: Jun. 25, 1998

[51] Int. Cl.$^6$ ........................................... B60R 21/16
[52] U.S. Cl. ........................................... 280/743.1
[58] Field of Search ..................... 280/743.1, 730.2, 280/730.1

[56] References Cited

U.S. PATENT DOCUMENTS

| | | |
|---|---|---|
| 4,286,954 | 9/1981 | McArthur et al. . |
| 5,348,341 | 9/1994 | Webber . |
| 5,364,126 | 11/1994 | Kuretake et al. . |
| 5,382,048 | 1/1995 | Paxton et al. . |
| 5,478,113 | 12/1995 | Rogers . |
| 5,492,367 | 2/1996 | Albright et al. . |
| 5,496,056 | 3/1996 | Dyer . |
| 5,570,900 | 11/1996 | Brown . |
| 5,667,243 | 9/1997 | Fisher et al. . |
| 5,681,052 | 10/1997 | Ricks et al. . |
| 5,730,463 | 3/1998 | Fisher et al. . |
| 5,752,714 | 5/1998 | Pripps et al. ......................... 280/730.2 |
| 5,765,863 | 6/1998 | Storey et al. ........................... 280/729 |
| 5,791,685 | 8/1998 | Lachat et al. ......................... 280/743.1 |
| 5,823,567 | 10/1990 | Behr et al. ............................ 280/743.1 |

*Primary Examiner*—Lanna Mai
*Assistant Examiner*—Jeff Restifo
*Attorney, Agent, or Firm*—Harness, Dickey & Pierce, P.L.C.

[57] ABSTRACT

An airbag folding pattern in which a portion of the airbag deploys vertically above or vertically below the airbag module retainer is folded so that it is located forward of the portion of the airbag that deploys directly forward of the retainer. By locating the portion of the bag that is vertically displaced forward of the remaining portion of the bag, the time necessary to deploy the airbag to position is reduced.

8 Claims, 2 Drawing Sheets

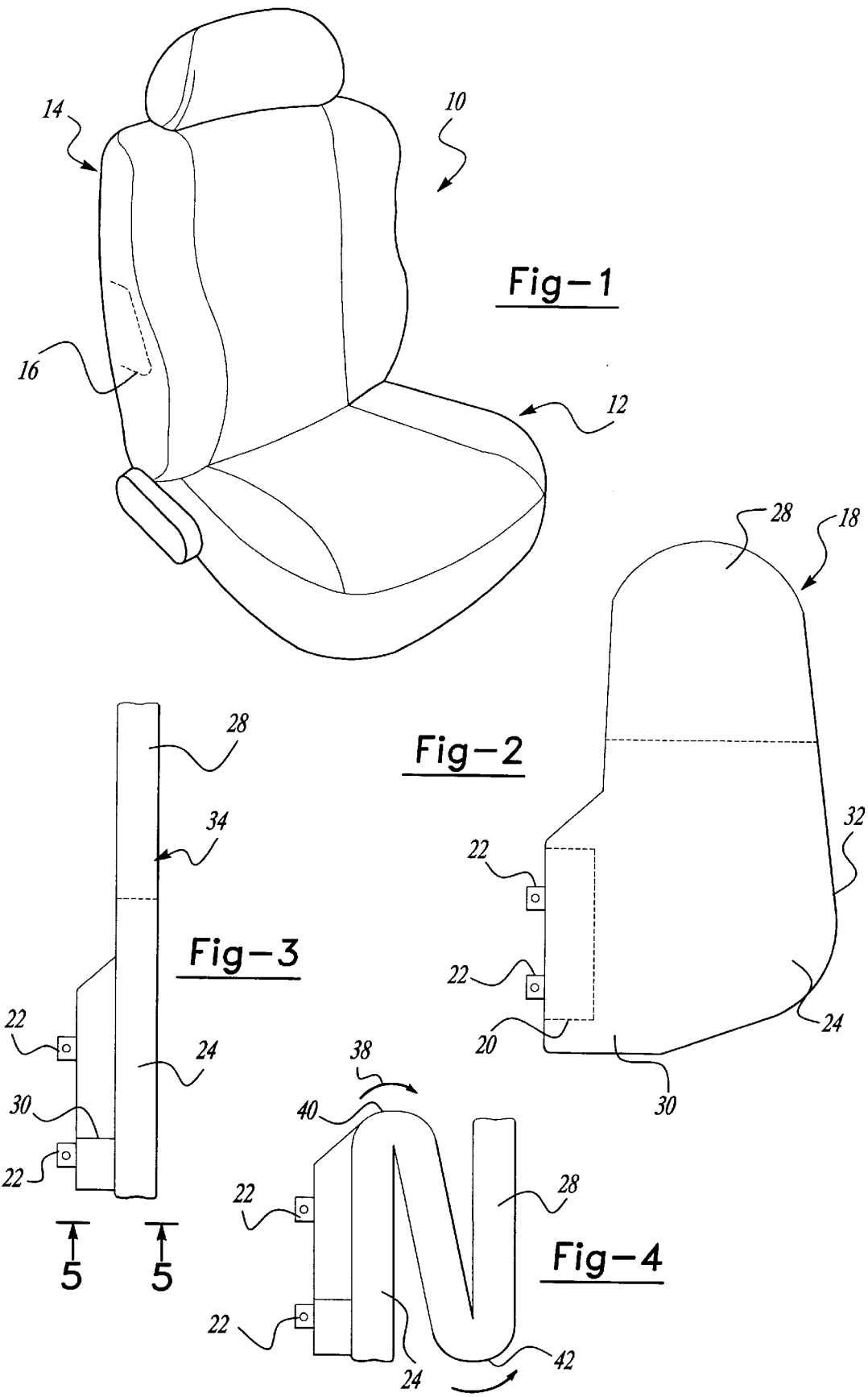

AIRBAG FOLDING PATTERN

BACKGROUND OF THE INVENTION

The present invention relates to a folding pattern for an inflatable airbag and in particular to a folding pattern in which portions of the airbag that extend upwardly above the airbag inflator when the bag is deployed, are folded to a position forward of the airbag deployment.

With all inflatable airbags, a very short period of time is available for the airbag to deploy. Side airbags have less time period to deploy than do front airbags. The pattern in which an airbag is folded has a significant impact on the time necessary for the airbag to deploy.

With many side airbags, the airbag module is located in a seat back adjacent to an occupant's thorax region. When deployed, the airbag not only extends forward from the seat back adjacent to the occupant's abdomen, but it also extends upward from the module retainer, alongside the occupant's thorax and head region. Generally speaking, the airbag can be considered as having head and thorax chambers separated by a fabric divider. The folding pattern of the present invention positions the upper region of the airbag forward, in the directional deployment, relative to the lower region of the airbag. By doing so, the bag resistance during deployment is reduced. As a result, time necessary for the airbag to deploy is reduced.

Further objects, features and advantages of the invention will become apparent from a consideration of the following description and the appended claims when taken in connection with the accompanying drawings.

BRIEF DESCRIPTION OF THE DRAWINGS

FIG. 1 is a perspective view of a vehicle seat assembly having a side airbag mounted in the seat back;

FIG. 2 is a side view of the side airbag inflated;

FIGS. 3 and 4 are side views of the airbag in partial folded conditions;

DETAILED DESCRIPTION OF THE PREFERRED EMBODIMENT

Figure 5:
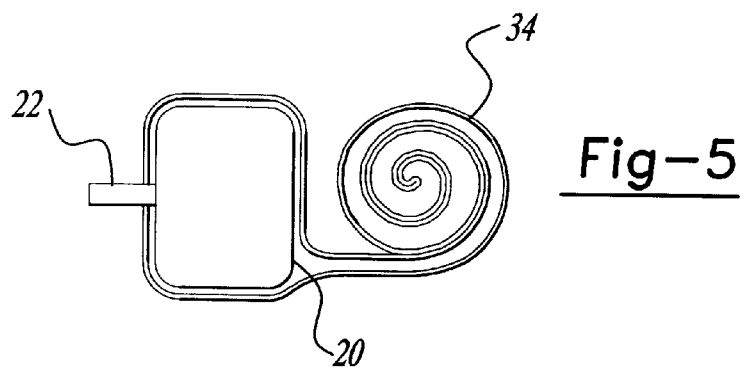
FIG. 5 is a bottom view looking upward at the airbag in the direction of arrow 5 in FIG. 3.

The airbag folding pattern of the present invention, while it may be applicable to all inflatable airbags, is particularly applicable to a side airbag such as a seat mounted airbag. A vehicle seat assembly is shown in FIG. 1 and designated generally at 10. The seat assembly 10 has a generally horizontal seat bottom 12 and an upright seat back 14. The seat back 14 includes a side airbag module 16 shown schematically. The side airbag module is of a conventional structure having an inflatable airbag 18, shown inflated in FIG. 2. The module further includes an inflator (not shown) and a retainer 20 for mounting the module to the seat back. The retainer includes mounting tabs 22 for attaching the module to the seat back.

The airbag can be generally described as having two regions or sections, a lower thorax region 24 and an upper head region 28. The retainer 20 is disposed in the lower region 24. The lower region 24, when the airbag is deployed, is positioned adjacent to the abdomen and thorax of the seat occupant. The upper region 28 is adjacent the head of a seat passenger when the airbag is deployed.

Figure 6:
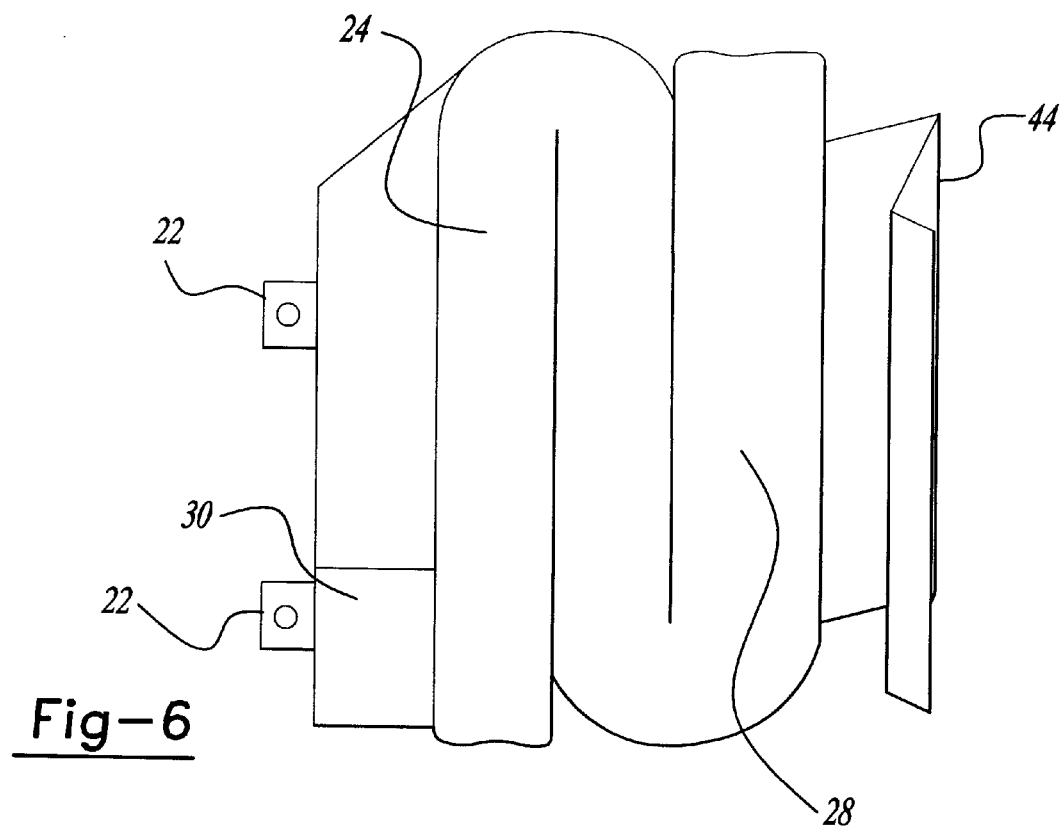
FIG. 6 is a side view of the folded airbag after the folding is completed illustrating the folded airbag being wrapped with a protective liner to hold it place.

The bag is folded by first folding upward a bottom edge portion 30 of the airbag which extends downward below the retainer. Next, the front or leading edge 32 of the airbag is rolled rearward, toward the retainer 20, forming a coiled column section 34 shown in FIG. 3, immediately forward of the retainer 20 and extending upwardly above the retainer. The coiled head region material of the airbag, which is above the retainer, is then folded forward of the remaining portion of the airbag in the direction of deployment. The coiled column section 34 is first folded downward in the direction of arrow 38 at the location approximately at the top of the retainer 20. This forms a first fold 40. A second fold 42 is made in a reverse direction as shown by the arrow 42 in which the upper region 28 is folded back against the previous folded section of the coiled column. When the folding is compete as shown in FIG. 6, the upper region of the airbag 28 is disposed forward of the lower region 24. The folded airbag is then wrapped in a thin sheet of flexible material 44, such as TYVEK, to hold the folded airbag in place.

As used throughout this application, the directional term "forward" is relative to the direction of the deployment of the airbag, i.e. the direction in which the airbag extends from the retainer 20 when deployed. Depending on the location of the airbag within a motor vehicle, this may or may not correspond with the forward direction of the vehicle.

The folding pattern of this invention folds the airbag so that the material of the airbag which deploys above the module retainer is in front of the material of the airbag in the lower region, where the retainer is located. While the invention is shown with a coiled column section 34 that is folded in thirds, the coiled column section 34 could be folded in half or in more than thirds, if desired.

In addition, the same principle of the invention can be applied in an airbag in which the bag deploys forwardly and downwardly as opposed to forwardly and upwardly as shown in the drawings. For example, if an airbag is located in the seat back head rest, it may deploy forwardly and then downwardly along the passenger's thorax and abdomen. In this situation, it is the lower portion of the bag which deploys at a different vertical location than the airbag module retainer. This portion of the airbag is located in front of the material forming the upper portion of the airbag and containing the module retainer.

It is to be understood that the invention is not limited to the exact construction illustrated and described above, but that various changes and modifications may be made without departing from the spirit and scope of the invention as defined in the following claims. For example, the invention can be used with an airbag having a single chamber or more than two chambers as well.

We claim:

1. An airbag module comprising an inflatable airbag and a retainer for mounting the module to a support structure, the retainer being disposed in a first portion of the airbag which, when the airbag is inflated extends forward of the retainer, the airbag having a second portion which, when the airbag is inflated, is vertically above or below the first portion of the airbag and the retainer, the airbag is folded in the module in such a manner that the airbag is rolled rearward from a forward edge to the retainer to form a coiled column section, afterwhich the second portion of the airbag which is vertically above or below the first portion is folded forward over the first portion whereby the second portion of the airbag is disposed forward of the first portion which is in turn disposed forward of the retainer.

2. The airbag module of claim 1 wherein the airbag has a third portion which extends from the first portion in the opposite direction relative to the second portion, the third portion is folded over onto the first portion and folded into the coiled column section along with the first portion of the airbag.

3. The airbag module of claim 1 wherein the coiled column section is folded over onto itself in thirds.

4. The airbag module of claim 1 wherein the second portion extends upward from the first portion.

5. The airbag module of claim 4 wherein the airbag includes a bottom edge portion which extends below the first portion and is folded upward along side the first portion and is rolled into the coiled column section.

6. A method of folding an inflatable side airbag of an airbag module for mounting to a vehicle seat back, the airbag module including a retainer and the airbag, the airbag having a lower portion in which the retainer is disposed, and an upper portion which deploys to a position above the retainer and the lower portion, the method of folding comprising the steps of:

rolling the airbag rearward from a forward most leading edge toward the retainer to form a coiled column with the upper portion of the airbag above the lower portion of the airbag;

forming a first fold by bending the coiled column over forwardly and downwardly approximately 180° adjacent to an upper end of the retainer such that the coiled column formed by the upper portion of the airbag extends downward below the retainer; and forming a second fold by reverse bending the downwardly extending portion of the coiled column forwardly and upwardly approximately 180° whereby the coiled upper portion of the airbag is disposed forward of the coiled lower portion which is in turn disposed forward of the retainer.

7. The method of claim 6 further comprising the step of folding a bottom portion of the airbag, which extends downward below the retainer upward prior to rolling the airbag rearward to form the upright coiled column.

8. The airbag module according to claim 1, wherein said first portion of said airbag is adapted, upon deployment, to protect a lower thorax region of a passenger and said second portion of said airbag is adapted, upon deployment, to protect an upper head region of a passenger.

* * * * *